Patented Oct. 15, 1929

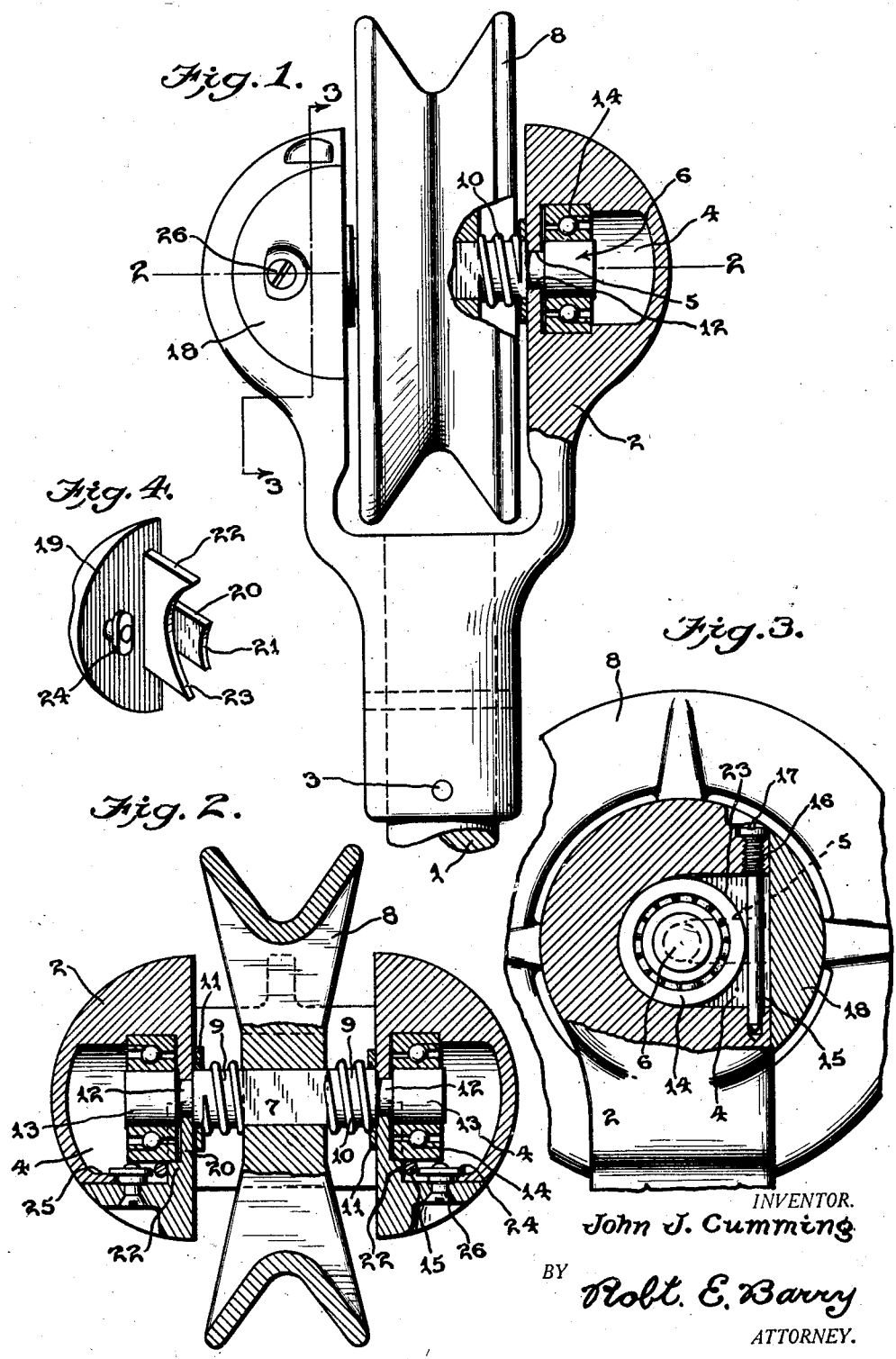

1,731,737

UNITED STATES PATENT OFFICE

JOHN J. CUMMING, OF BOSTON, MASSACHUSETTS

TROLLEY

Application filed March 30, 1928. Serial No. 265,351.

This invention relates to improvements in trolleys, and more particularly to a novel trolley wheel and supporting means for the same.

The primary object of the invention is to provide a trolley wheel and support of simple inexpensive and durable construction, and one which will require only infrequent inspection and recharging with lubricant.

Another object of the invention is to furnish a device of this character, in which the trolley wheel axle revolves with the wheel, and is journaled in constantly lubricated anti-friction bearings.

A further object is to provide a structure of this character, in which each lubricant chamber is furnished with a quick detachable cap to permit rapid recharging with grease or the like when necessary.

A still further object is to provide a trolley wheel device in which the wheel, axle and bearings may be rapidly removed for the purpose of inspection or the like.

Another object is to furnish a device of this character with removable threaded pins for positively locking the bearings against accidental dislodgment.

With the foregoing objects outlined and with other objects in view which will appear as the description proceeds, my invention consists in the novel features hereinafter described in detail, illustrated in the accompanying drawings, and more particularly pointed out in the appended claims.

Referring to the drawing,

Fig. 1 is a front view of the upper end of a trolley pole provided with my improvements; partly in section to facilitate illustration.

Fig. 2 is a horizontal sectional view, taken on line 2—2 of Fig. 1.

Fig. 3 is a sectional view on line 3—3 of Fig. 1.

Fig. 4 is a perspective view of one of the lubricant chamber caps.

In the drawing, 1 designates a trolley pole to which my improved fork 2 may be removably secured by any suitable means, such as a pin or bolt 3.

Each arm of the fork has a thickened upper portion hollowed out to provide a lubricant chamber 4, the inner wall of which is cut away as shown at 5 in Fig. 3, to provide a slot to permit the axle 6 to be slid into place from the front of the fork.

The axle, as best shown in Fig. 2, has a central portion 7 of angular or square cross section, and the trolley wheel 8 has an aperture of similar shape, so that the wheel and axle will revolve together. The portions 9 of the axle are of cylindrical shape to receive coiled springs 10 preferably formed of brass. These springs act as conductors to convey the current from the wheel to the fork, and they also tend to keep the wheel in proper or central position. If desired, copper washers 11 may be placed between the springs and the inner surfaces of the arms of the fork, as a protection against wear on said arms.

The axle also has a pair of annular groves 12 near its ends to fit in the slots 5, and this permits the enlarged ends 13 of the axle to prevent the arms of the fork from spreading.

Suitable anti-friction bearings, such as ball bearings 14 are loosely arranged on the ends of the axle, and they slide into the lubricant chambers 4 with the axle, and after they are arranged in position, locking pins 15 are slipped into position to secure the bearings, and consequently, the wheel and axle in place. Each locking pin is threaded at 16 to engage threads formed in the arm 2, and the head of each pin is grooved at 17, so that a screw driver may be employed to manipulate the pins.

The forward ends of the chambers 4 are open to allow grease to be packed into the chambers, and after the grease has been inserted, the mouths of the chambers are closed by removable caps 18, one of which is shown in detail in Fig. 4. Each cap consists of a body 19 having an arm 20 adapted to fit in the slot 5 for holding the axle in position, and the inner end of each arm is curved as shown at 21 to fit in one of the grooves 12.

A second and wider arm 22 projects inwardly from the cap and lies alongside of the arm 20, and the arm 22 has a curved extremity 23 which abuts against one of the bearings 14 and acts as an additional securing means, and both arms 20 and 22 function to prevent the lubricant from seeping out along the slot 5.

A rotatable latch 24 is provided on each cap, and when the latch is properly turned, it will engage a ledge 25 on the arm 2, to secure the cap in position. Each latch has a screw head 26 to permit manipulation of the same by a screw-driver or the like.

As the chambers 4 are quite large, they will accommodate a rather large supply of lubricant, and consequently, the wheel may be used for a comparatively great length of time without resupplying the grease. When it is necessary to renew the lubricant, this may be rapidly accomplished by simply turning the latches 24 by means of a screw-driver, and this permits the removal of the caps, so as to make the mouths of the chambers 4 accessible.

If it is necessary at any time to remove the wheel, this may be quickly accomplished by first removing the caps, and then the pins 15, after which the axle 6 will readily slide out of the slots 5, when the wheel is pulled forwardly.

As the wheel 8, springs 9, washers 11, and bearings 14 are all loosely mounted on the axle, such parts may be readily dismantled for inspection, repair or replacement.

From the foregoing it is believed that the construction, operation and advantages of the invention may be readily understood, and I am aware that various changes may be made in the details disclosed without departing from the spirit of the invention, as expressed in the following claims.

What I claim and desire to secure by Letters Patent is:

1. In combination, a trolley fork, an axle having its ends journaled in the tines of the fork, chambers in the fork tines, anti-friction bearings for the axle arranged in said chambers, means to permit the axle and bearings to be removed as a unit from the fork without separating the tines, and a trolley wheel mounted on and rotatable with the axle.

2. In combination, a trolley fork having chambers with slotted walls, an axle having its ends extending through the slots into the chambers, bearings for the axle, each chamber forming a lubricant container, said slots permitting the axle and bearings to be removed as a unit from the fork, and removable caps for said chambers and slots.

3. In a device of the character described, an axle having annular grooves near its ends, a wheel mounted on and rotatable with the axle, and a fork having slotted arms which extend into said grooves.

4. In combinatian, a fork having arms provided with chambers having slotted inner walls, an axle having annular grooved portions slidable in said slots, a trolley wheel rotatable with and slidable along said axle, and springs arranged on the axle between the wheel and said arms.

5. In combination, a fork having arms provided with chambers having slotted walls, an axle slidable in the slots and having end portions engaging the slotted walls to prevent said arms from spreading, and a trolley wheel mounted on said axle.

6. In combination, a fork having chambered arms provided with slots, an axle having annular grooved portions slidable in said slots, bearings for the axle arranged within said chambers, a trolley wheel mounted on said axle, and caps closing said slots.

7. In combination with a trolley fork having chambers in its tines, an axle having end portions extending into said chambers, anti-friction bearings removably mounted on the ends of the axle and arranged in the chambers, a trolley wheel rotatable with, and slidable along the axle, springs on the axle bearing against the opposite sides of the wheel, and means for holding said axle and bearings on the fork, said means permitting the axle, wheel, springs and bearings to be removed as a unit from the fork.

8. In combination, a trolley fork having chambered arms provided with slots, an axle slidable along said slots, said chambers having open ends to receive lubricant, caps closing the open ends of the chambers and having extensions closing said slots, and a wheel mounted on said axle.

9. In combination, a trolley fork having chambered arms provided with slotted walls, an axle having annular grooved portions slidable along said slots, anti-friction bearings mounted on the ends of the axle and arranged in said chambers, and caps for the chambers, having extensions for sealing said slots.

JOHN J. CUMMING.